US 11,512,676 B2

(12) United States Patent
Fujima et al.

(10) Patent No.: US 11,512,676 B2
(45) Date of Patent: Nov. 29, 2022

(54) DETECTION APPARATUS AND CONTROL APPARATUS

(71) Applicant: HONDA MOTOR CO., LTD., Tokyo (JP)

(72) Inventors: Akifumi Fujima, Wako (JP); Kazumi Miyashita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/209,511

(22) Filed: Mar. 23, 2021

(65) Prior Publication Data
US 2021/0301776 A1 Sep. 30, 2021

(30) Foreign Application Priority Data

Mar. 31, 2020 (JP) .............................. JP2020-064869

(51) Int. Cl.
*F02P 7/06* (2006.01)
*F02P 5/15* (2006.01)
(Continued)

(52) U.S. Cl.
CPC .......... *F02P 5/1502* (2013.01); *F02B 61/045* (2013.01); *F02B 75/02* (2013.01);
(Continued)

(58) Field of Classification Search
CPC combination set(s) only.
See application file for complete search history.

(56) References Cited

U.S. PATENT DOCUMENTS 4,873,958 A * 10/1989 Abe ...................... F02P 5/1553
123/406.54
4,926,822 A * 5/1990 Abe ...................... F02D 41/062
123/406.62
(Continued)

FOREIGN PATENT DOCUMENTS

CN 105508071 A * 4/2016
DE 19741597 A1 * 3/1999 ................ F01L 1/46
(Continued)

OTHER PUBLICATIONS

JPH0953503A—English Translation (Year: 1997).*
DE 19741597 A1—English Translation (Year: 1999).*

*Primary Examiner* — George C Jin
*Assistant Examiner* — Teuta B Holbrook
(74) *Attorney, Agent, or Firm* — WHDA, LLP

(57) ABSTRACT

A detection apparatus for detecting a cam angle of a 4-stroke multi-cylinder engine in which explosion intervals are unequal intervals, includes a detection target member configured to rotate in synchronism with a camshaft, and first and second cam angle sensors configured to detect rotation of the detection target member. The detection target member includes a plurality of first detection target portions arranged, at equal pitches, as many as the number of cylinders of the multi-cylinder engine. The second cam angle sensor is arranged while being shifted in the rotation direction with respect to the first cam angle sensor such that any one of detection signals of the plurality of first detection target portions by the first cam angle sensor and the second cam angle sensor is output at a timing corresponding to each explosion interval.

10 Claims, 6 Drawing Sheets

(51) Int. Cl.
*F02D 41/00* (2006.01)
*F02B 75/02* (2006.01)
*F02B 61/04* (2006.01)
*F02B 75/18* (2006.01)

(52) U.S. Cl.
CPC ............ *F02B 75/18* (2013.01); *F02D 41/009* (2013.01); *F02B 2075/027* (2013.01)

(56) References Cited

U.S. PATENT DOCUMENTS

| | | | | |
|---|---|---|---|---|
| 5,222,394 | A * | 6/1993 | Imai | F02P 5/1508 73/114.04 |
| 6,041,647 | A * | 3/2000 | Matsuoka | F02D 41/009 123/90.17 |
| 6,332,352 | B1 * | 12/2001 | Sano | G01M 15/08 73/114.15 |
| 7,430,998 | B2 * | 10/2008 | Stork | F01L 1/352 123/90.15 |
| 2005/0109302 | A1 * | 5/2005 | Tetsuno | F02N 11/0844 123/179.5 |
| 2007/0170913 | A1 * | 7/2007 | Yokotani | G01D 5/147 324/207.22 |
| 2008/0092841 | A1 * | 4/2008 | Takahashi | F02D 41/009 123/179.16 |
| 2010/0324778 | A1 * | 12/2010 | Foster | G01D 5/34776 701/29.2 |
| 2011/0253085 | A1 * | 10/2011 | Kokubo | F01L 1/34 123/90.17 |
| 2012/0101708 | A1 * | 4/2012 | Hirai | F02D 41/009 701/103 |
| 2012/0217118 | A1 * | 8/2012 | Nedachi | F16D 28/00 192/84.7 |
| 2013/0255632 | A1 * | 10/2013 | Yoshikawa | F02M 69/00 123/445 |
| 2014/0041607 | A1 * | 2/2014 | Hiyoshi | F02D 15/02 123/90.15 |

FOREIGN PATENT DOCUMENTS

| | | | | |
|---|---|---|---|---|
| DE | 112014006320 T5 | * | 11/2016 | ............ F02D 41/222 |
| GB | 1577687 A | * | 10/1980 | ............. F02P 15/08 |
| JP | 01277663 A | * | 11/1989 | ........... F02D 41/062 |
| JP | 09053502 A | * | 2/1997 | |
| JP | 2001342888 A | * | 12/2001 | |
| JP | 2006183593 A | * | 7/2006 | |
| JP | 2013-160086 A | | 8/2013 | |

* cited by examiner

FIG. 6

| CRANKSHAFT SHAPE | PATTERN | IGNITION ORDER | | | | | | | |
|---|---|---|---|---|---|---|---|---|---|
| | | 1 | 2 | 3 | 4 | 5 | 6 | 7 | 8 |
| X | A | #1 | #5 | #4 | #2 | #6 | #3 | #7 | #8 |
| | B | #1 | #3 | #7 | #2 | #6 | #5 | #4 | #8 |
| | C | #1 | #5 | #7 | #2 | #6 | #3 | #4 | #8 |
| | D | #1 | #5 | #4 | #8 | #6 | #3 | #7 | #2 |
| Y | A | #1 | #5 | #4 | #3 | #7 | #2 | #6 | #8 |
| | B | #1 | #2 | #6 | #3 | #7 | #5 | #4 | #8 |
| | C | #1 | #5 | #6 | #3 | #7 | #2 | #4 | #8 |
| | D | #1 | #5 | #4 | #8 | #7 | #2 | #6 | #3 |

DETECTION APPARATUS AND CONTROL APPARATUS

CROSS-REFERENCE TO RELATED APPLICATION(S)

This application claims priority to and the benefit of Japanese Patent Application No. 2020-064869 filed on Mar. 31, 2020, the entire disclosure of which is incorporated herein by reference.

BACKGROUND OF THE INVENTION

Field of the Invention

The present invention relates to a technique of generating an ignition timing signal.

Description of the Related Art

In control of the ignition timing of an engine, a technique using the detection results of a cam angle and a crank angle is known. There is also proposed a technique in which a plurality of cam angle sensors are provided for the purpose of fail-safe (for example, Japanese Patent Laid-Open No. 2013-160086). In general, a cam angle sensor detects the rotation of a detection target member such as a gear that rotates in synchronism with a camshaft. In the detection target member, not only a detection target portion for ignition timing corresponding to an ignition timing but also a detection target portion for stroke discrimination is provided. The detection target portion for stroke discrimination represents that, for example, the piston of a specific cylinder is located on the top dead center.

In a multi-cylinder engine in which the explosion interval is unequal, if the positions of detection target portions for ignition timing are set in correspondence with unequal explosion intervals, the pitch between the detection target portions varies, and large and small pitches simultaneously exist between adjacent detection target portions. As a result, it is sometimes difficult to discriminate, in the detection signal of the cam angle sensor, whether a detection target portion for ignition timing is detected or a detection target portion for stroke discrimination is detected.

SUMMARY OF THE INVENTION

It is an object of the present invention to provide a technique of obtaining an ignition timing signal without setting the positions of detection target portions for ignition timing in correspondence with unequal explosion intervals.

According to an aspect of the present invention, there is provided a detection apparatus for detecting a cam angle of a 4-stroke multi-cylinder engine in which explosion intervals are unequal intervals, comprising: a detection target member configured to rotate in synchronism with a camshaft; a first cam angle sensor configured to detect rotation of the detection target member; and a second cam angle sensor configured to detect rotation of the detection target member; wherein the detection target member includes a plurality of first detection target portions arranged, at equal pitches, as many as the number of cylinders of the multi-cylinder engine in a rotation direction of the detection target member, and the second cam angle sensor is arranged while being shifted in the rotation direction with respect to the first cam angle sensor such that any one of detection signals of the plurality of first detection target portions by the first cam angle sensor and the second cam angle sensor is output at a timing corresponding to each explosion interval.

Further features of the present invention will become apparent from the following description of exemplary embodiments (with reference to the attached drawings).

BRIEF DESCRIPTION OF THE DRAWINGS

FIG. 6 is a view showing other examples of crankshaft shapes and ignition orders.

DESCRIPTION OF THE EMBODIMENTS

Figure 1:
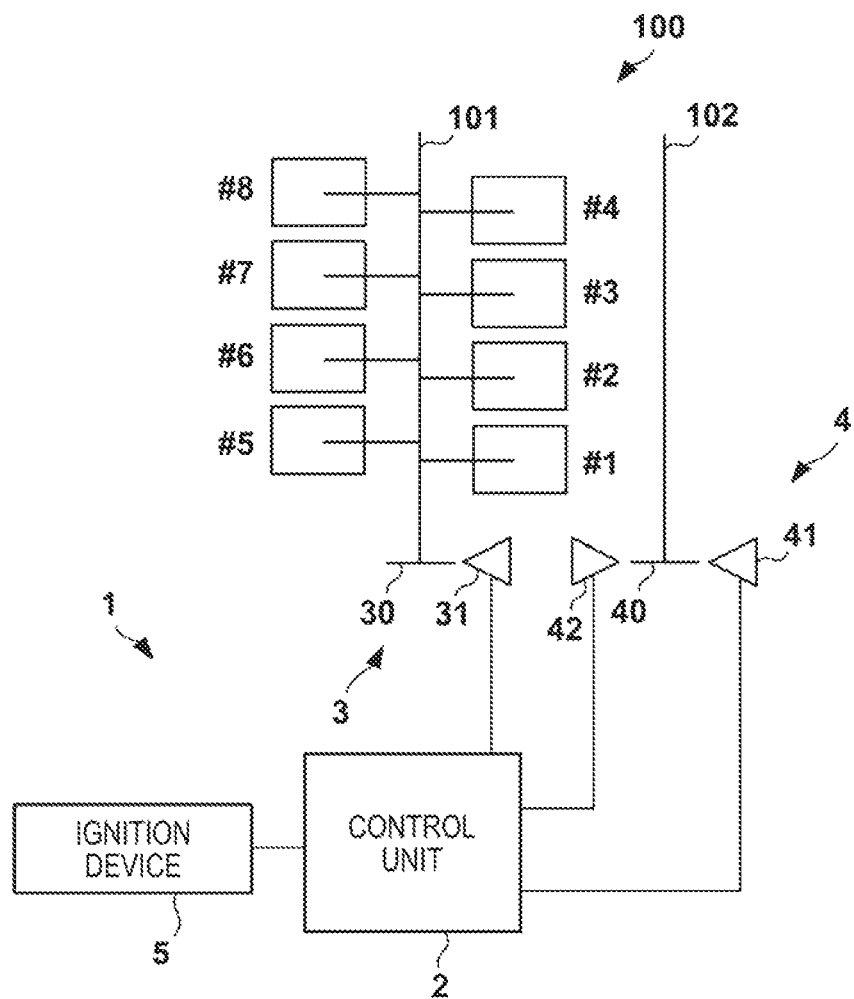
FIG. 1 is a block diagram of a control apparatus.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram of a control apparatus 1 according to an embodiment of the present invention. The control apparatus 1 is an apparatus that performs ignition control of a 4-stroke reciprocating engine 100. The engine 100 according to this embodiment is an outboard V-type 8-cylinder naturally aspirated engine. Cylinders #1 to #4 are provided on one bank, and cylinders #5 to #8 are provided on the other bank. The bank angle is 60°.

In the engine 100, the explosion intervals are unequal. The explosion intervals are 120°, 60°, 90°, 120°, 60°, 120°, and 90° in terms of the crank angle. A total of eight crank pins are provided on the crankshaft 101 in correspondence with the cylinders. The angle of the phase arrangement of the four crank pins on one bank is 90°. The offset angle of the crank pins between the banks is 60°. The engine 100 is an SOHC engine including two camshafts including a camshaft 102. In one cycle of the engine 100, the camshaft 102 makes one rotation, and the crankshaft 101 makes two rotations.

The control apparatus 1 includes a control unit (ECU) 2, a detection apparatus 3 that detects a crank angle, a detection apparatus 4 that detects a cam angle, and an ignition device 5. The detection apparatus 3 includes a detection target member 30 that rotates in synchronism with the crankshaft 101, and a crank angle sensor 31 that detects the rotation of the detection target member 30. The detection target member 30 according to this embodiment is a gear coaxially fixed to the crankshaft 101, and the crank angle sensor 31 is a magnetic sensor or optical sensor configured to detect teeth that are detection target portions formed on the outer periphery of the detection target member 30. The teeth are formed at a pitch of 30° in terms of the crank angle.

The detection apparatus 4 includes a detection target member 40 that rotates in synchronism with the camshaft 102, and cam angle sensors 41 and 42 that detect the rotation of the detection target member 40. The detection target member 40 according to this embodiment is a gear coaxially fixed to the camshaft 102, and the cam angle sensors 41 and 42 are magnetic sensors or optical sensors configured to detect teeth that are detection target portions formed on the outer periphery of the detection target member 40.

The control unit 2 includes a processor represented by a CPU, a storage device such as a semiconductor memory, and an input/output interface to an external device. The storage device stores programs to be executed by the processor and data to be used for processing by the processor. The control unit 2 operates the ignition device 5 based on the detection signals of the crank angle sensor 31 and the cam angle sensors 41 and 42, thereby performing ignition control on a cylinder basis.

<Detection Apparatus>

Figure 2:
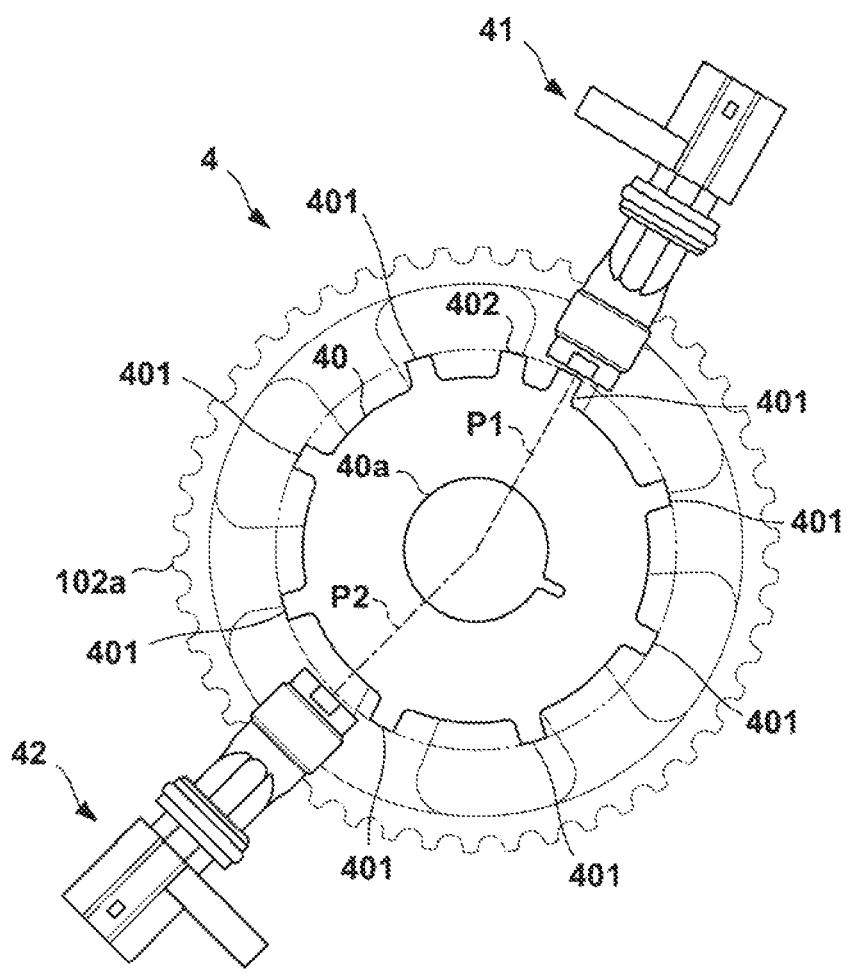
FIG. 2 is a view showing an example of the arrangement of two cam angle sensors.

The arrangement of the detection apparatus 4 will be described with reference to FIG. 2. FIG. 2 is a view showing the layout of the detection apparatus 4 when the camshaft 102 is viewed in the camshaft direction (when viewed from the side of a cam sprocket 102a). The detection target member 40 is a disc-shaped member including, at the center, an attachment hole 40a to which the camshaft 102 (not shown) is fixed. A plurality of tooth-shaped detection target portions 401 and one detection target portion 402, which project in the radial direction, are formed on the outer periphery of the detection target member 40.

The detection target portions 401 are detection target portions for ignition timing and are provided as many as the number of cylinders (eight). The detection target portion 402 is a detection portion for stroke discrimination. The detection target portion 402 is arranged to be adjacent to one of the plurality of detection target portions 401 at a pitch different from the pitch between the plurality of detection target portions 401, and can be discriminated from the other detection target portions 401. The position of the detection target portion 402 is made to correspond to the position of the piston of a specific cylinder. In this embodiment, setting is done such that when the piston of cylinder #1 passes through the top dead center, the cam angle sensor 41 detects the detection target portion 402. Also, in this embodiment, setting is done such that when the piston of cylinder #6 passes through the top dead center, the cam angle sensor 42 detects the detection target portion 402.

In the engine 100, the explosion intervals are unequal. However, although the detection target portions 401 are detection target portions for ignition timing, the plurality of detection target portions 401 are not arranged in correspondence with the ignition timings of the cylinders, and are arranged at equal pitches in the rotation direction of the detection target member 40. That is, it is an arrangement in a case in which the explosion intervals are equal. The explosion intervals according to this embodiment are 120°, 60°, 90°, 120°, 60°, 120°, and 90° in terms of the crank angle, as described above. Hence, to correspond to the explosion intervals, the plurality of detection target portions 401 are provided at intervals of 60°, 30°, 45°, 60°, 30°, and 45° in terms of the cam angle. In this arrangement, however, it is difficult to provide the detection target portion 402 for stroke discrimination. Alternatively, the pitches between the detection target portions 401 and the detection target portion 402 approximate, and it is sometimes difficult to discriminate between the detection target portion 402 and the detection target portions 401 in the detection signals.

In this embodiment, as in a case in which the explosion intervals are equal, the plurality of detection target portions 401 are arranged at equal pitches in the rotation direction of the detection target member 40, and ignition timing signals for unequal explosion are generated using the two cam angle sensors 41 and 42. In FIG. 2, the cam angle sensor 42 is arranged while being shifted in the rotation direction of the detection target member 40 with respect to the cam angle sensor 41. This arrangement is designed such that any one of the detection signals of the plurality of detection target portions 401, which are output from the two cam angle sensors 41 and 42, is output at a timing corresponding to each explosion interval. In other words, a detection position P1 of the cam angle sensor 41 and a detection position P2 of the cam angle sensor 42 have a phase difference corresponding to the explosion interval in the rotation direction of the detection target member 40.

Figure 3:
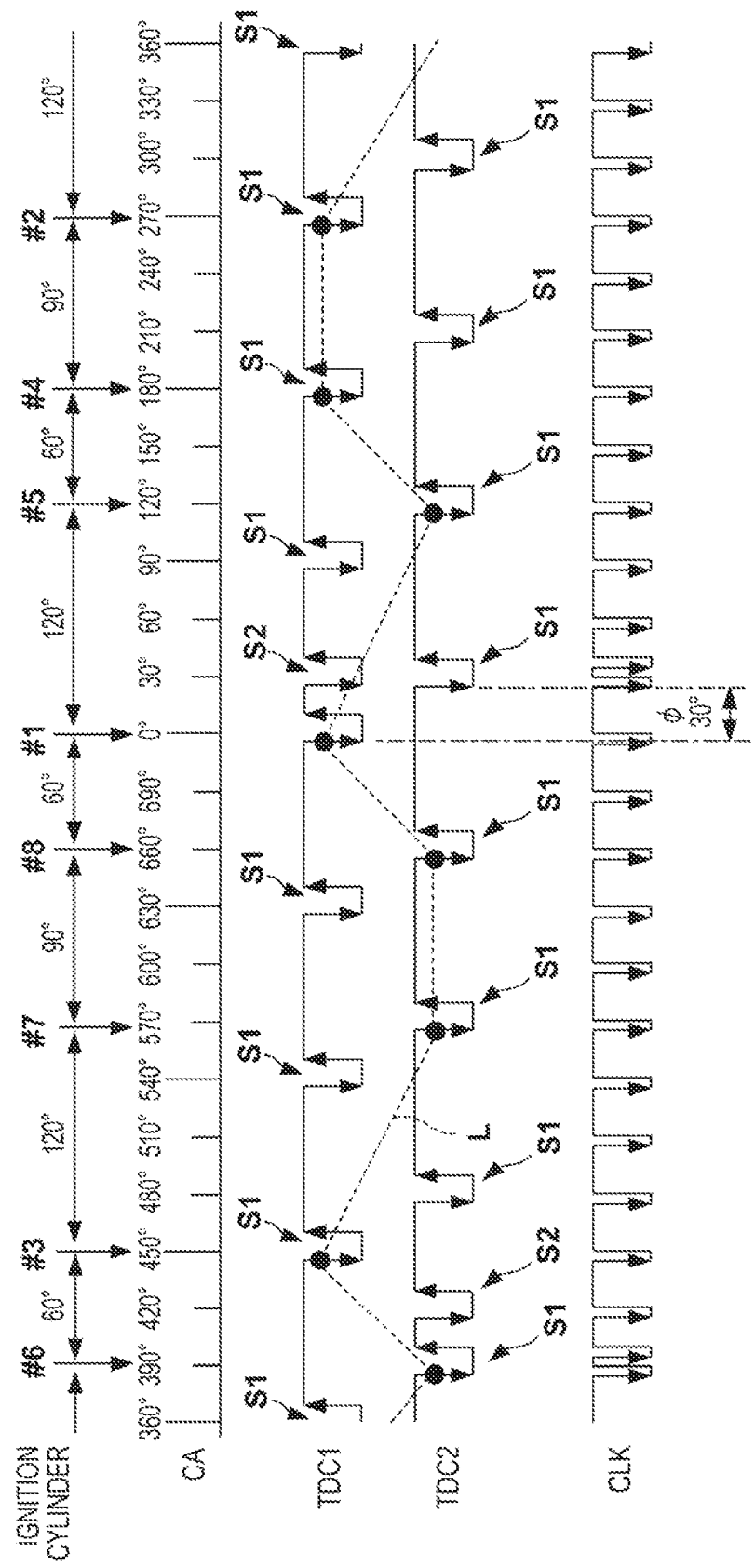
FIG. 3 is a view showing detection signal strings.

FIG. 3 shows a detection signal TDC1 of the cam angle sensor 41, a detection signal TDC2 of the cam angle sensor 42, a detection signal CLK of the crank angle sensor 31, and the ignition timings of cylinders #1 to #8 along with a change of a crank angle CA in one cycle. In the example shown in FIG. 3, the timing at which the piston of cylinder #1 is located at the top dead center is set to 0°.

Of the changes of the detection signals TDC1 and TDC2, S1 indicates a signal of detection of the detection target portion 401, and S2 indicates a signal of detection of the detection target portion 402. The detection signals TDC1 and TDC2 are identical signal strings having a phase difference. The trailing edge of a detection signal indicated by a full circle is used as an ignition timing signal. A broken line L is a line that connects full circles, and represents the transition of the detection signals TDC1 and TDC2 used as ignition timing signals.

In the example shown in FIG. 3, the detection signal TDC1 is used as the ignition timing signal for cylinders #1, #4, #2, and #3, and the detection signal TDC2 is used as the ignition timing signal for cylinders #5, #6, #7, and #8.

When the detection signal TDC1 and the detection signal TDC2 are regarded as the detection signal strings of the plurality of detection target portions 401, these have a phase difference φ of 30° in terms of the crank angle CA. This corresponds to 15° in terms of the cam angle. Hence, when the two cam angle sensors 41 and 42 are shifted by 15° in the rotation direction of the detection target member 40, detection signal strings as shown in FIG. 3 can be obtained. However, in some cases, it is difficult to arrange the two cam angle sensors 41 and 42 at an interval of 15° because of the size of the sensors.

To obtain signals shifted by 30° as the detection signal TDC1 and the detection signal TDC2, the two cam angle sensors 41 and 42 need not always be arranged at an interval of 15°. Arranging them at an interval of 15°×N (natural number) suffices. In the example shown in FIG. 2, the two cam angle sensors 41 and 42 are arranged at a shift of 15°×13=180°+15°=195°. In other words, the detection position P1 of the cam angle sensor 41 and the detection position P2 of the cam angle sensor 42 have a phase difference of 195° in the rotation direction of the detection target member 40. A cam angle of 180° corresponds to the crank angle CA of 360°. With this arrangement, the two cam angle sensors 41 and 42 can easily be arranged, and detection signal strings having the phase difference φ of 30° in terms of the crank angle CA can be obtained.

In this embodiment, the phase difference φ of 30° in terms of the crank angle CA corresponds to an angle concerning the greatest common divisor of the explosion intervals (60°, 90°, and 120°). It is necessary to merely arrange the two cam angle sensors 41 and 42 at an interval of (the angle corresponding to the greatest common divisor)/2*N.

As described above, according to this embodiment, it is possible to obtain an ignition timing signal without setting the positions of detection target portions for ignition timing in correspondence with unequal explosion intervals.

<Control Example>

A control example of the control unit 2 will be described. In this embodiment, ignition timing signals capable of discriminating a stroke can be obtained at one of three types of:

A. the detection signals of the two cam angle sensors 41 and 42,

B. the detection signals of the crank angle sensor 31 and the cam angle sensor 41, and C. the detection signals of the crank angle sensor 31 and the cam angle sensor 42.

Ignition control for delay and advance can be performed using these signals as a reference.

The crank angle sensor 31 has a resolution higher than that of the cam angle sensors 41 and 42 and may therefore be disadvantageous at the time of start of the engine 100 when the rotation is unstable. Hence, ignition control can be performed using the ignition timing signals A at the time of start of the engine 100, and using the ignition timing signals B or C after the start when the rotation is stabilized. The two cam angle sensors 41 and 42 also function as sensors for smooth start of the engine 100.

In this embodiment, since the three types of ignition timing signals can be selected, fail-safe can be obtained. Particularly, concerning an outboard engine, if the engine stops on the sea, return is difficult. In this embodiment, if a failure occurs in the cam angle sensor 41, the engine 100 can be started using the ignition timing signals C. If a failure occurs in the cam angle sensor 42, the engine 100 can be started using the ignition timing signals B. In this embodiment, if a failure occurs in the crank angle sensor 31, the engine 100 can be started using the ignition timing signals A. In this way, the two cam angle sensors 41 and 42 also function as sensors for fail-safe. Note that to discriminate a failure, a known technique is used.

<Other Examples of Crankshaft Shapes and Ignition Orders>

Concerning the engine 100 shown in FIG. 1, other examples of crankshaft shapes and ignition orders will be described with reference to FIG. 6. Each ignition order (explosion interval) assumes that a predetermined direction is set to forward rotation concerning the rotation direction of the engine 100. In the example shown in FIG. 6, two types including a shape X and a shape Y are assumed as crankshaft shapes. In both the shape X and the shape Y, the angle of the phase arrangement of the four crank pins on one bank is 90°. The offset angle of the crank pins between the banks is 60°. In the shape X, as for the phase arrangement, the four crank pins on one bank are shifted by 90° in the order of cylinder #1→cylinder #2→cylinder #4→cylinder #3, and the crank pins are shifted by 90° in the order of cylinder #5→cylinder #6→cylinder #8→cylinder #7. On the other hand, in the shape Y, as for the phase arrangement, the four crank pins on one bank are shifted by 90° in the order of cylinder #1→cylinder #3→cylinder #4→cylinder #2, and the crank pins are shifted by 90° in the order of cylinder #5→cylinder #7→cylinder #8→cylinder #6. For each shape, four patterns (A to D) of ignition orders exist. The explosion intervals of the cylinders are unequal explosion intervals in the combination of 60°, 90°, and 120°.

For example, the ignition order of the pattern A of the shape X is as follows. The angle of the phase arrangement of two crank pins is 60° between the first cylinder #1 and the second cylinder #5. The angle of the phase arrangement between the banks is +60°. Hence, the explosion interval is 120° (60°+60°=120°). The angle of the phase arrangement of two crank pins is 120° between the second cylinder #5 and the third cylinder #4, and the angle of the phase arrangement between the banks is −60°. Hence, the explosion interval is 60° (120°−60°=60°). Similarly, the explosion interval between the third cylinder #4 and the fourth cylinder #2 is 90°. The explosion interval between the fourth cylinder #2 and the fifth cylinder #6 is 120°. The explosion interval between the fifth cylinder #6 and the sixth cylinder #3 is 60°. The explosion interval between the sixth cylinder #3 and the seventh cylinder #7 is 120°. The explosion interval between the seventh cylinder #7 and the eighth cylinder #8 is 90°. The explosion interval between the eighth cylinder #8 and the first cylinder #1 is 60°.

However, focusing on each bank, the explosion intervals of the four cylinders are unequal explosion intervals in the combination of 90°, 180°, and 270°. For example, in the pattern A of the shape X, the explosion interval between the first cylinder #1 and the third cylinder #4 is 180° (120°+60°=) 180°. The explosion interval between the third cylinder #4 and the fourth cylinder #2 is 90°. The explosion interval between the fourth cylinder #2 and the sixth cylinder #3 is 180° (120°+60°=180°). The explosion interval between the sixth cylinder #3 and the first cylinder #1 is 270° (120°+90°+60°=270°).

That is, the explosion intervals on each bank is explosion intervals similar to those in a conventional V-type engine with a bank angle of 60° in which the offset angles of crank pins is 30°, or a V-type 8-cylinder engine with a bank angle of 90°, like a cross-plane crankshaft. As a result, it can be considered that the engine with the shape X has output performance similar to that of the conventional V-type 8-cylinder engine.

Second Embodiment

Figure 4:
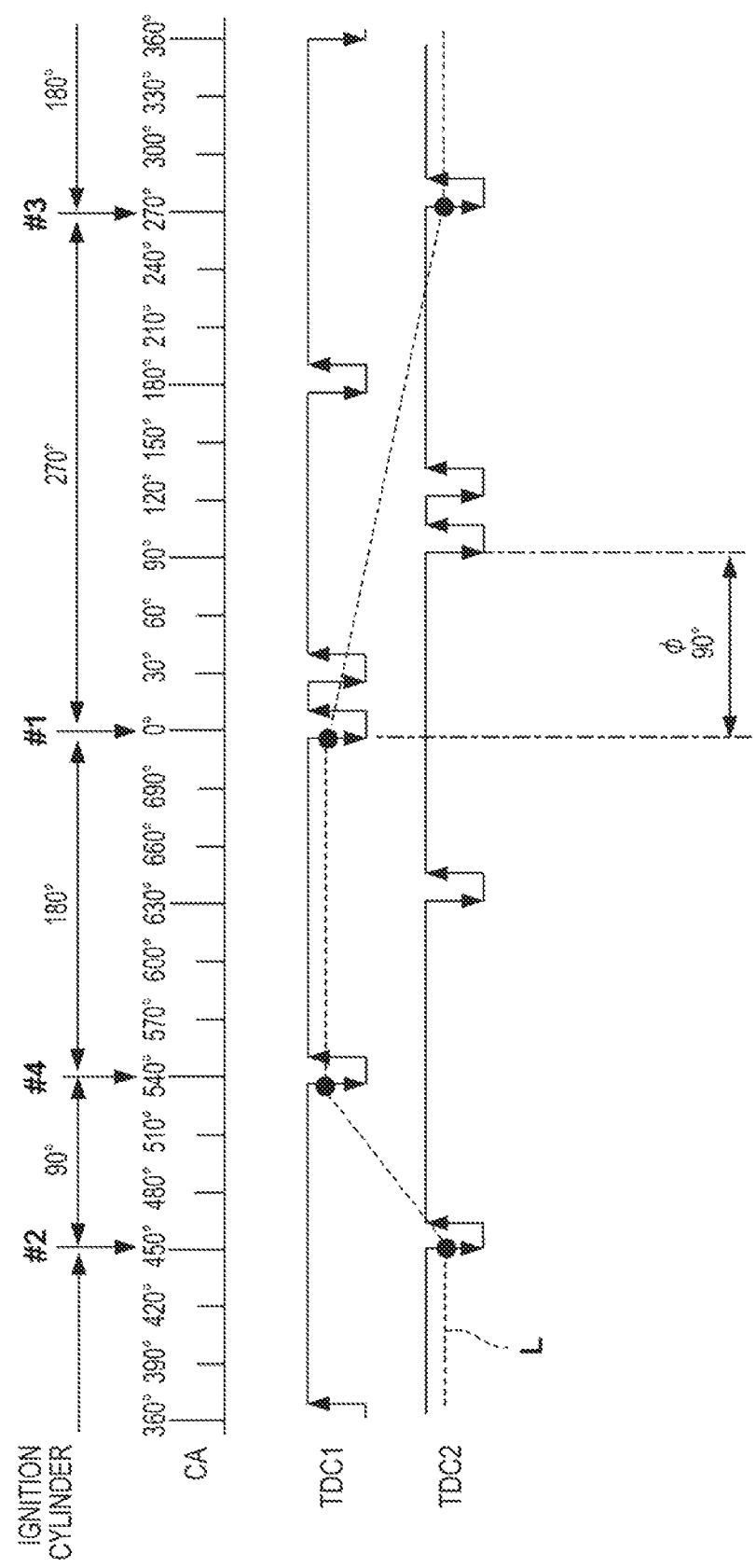
FIG. 4 is a view showing an example of application to another multi-cylinder engine.

In the first embodiment, an example of application to the V-type 8-cylinder engine 100 has been described. The present invention can also be applied to an engine with another cylinder arrangement in which the explosion intervals are unequal intervals. FIG. 4 shows changes of detection signal strings in an example of application to a straight 4-cylinder engine. In the example shown in FIG. 4, the explosion intervals are 270°, 180°, 90°, and 180° in terms of the crank angle. Four detection target portions 401 are provided at equal pitches in accordance with the number of cylinders. In the example shown in FIG. 4, a detection signal TDC1 is used as the ignition timing signal for cylinders #1 and #4, and a detection signal TDC2 is used as the ignition timing signal for cylinders #2 and #3.

When the detection signal TDC1 and the detection signal TDC2 are regarded as the detection signal strings of the plurality of detection target portions 401, these have a phase difference $\phi$ of 90° in terms of a crank angle CA. This corresponds to 45° in terms of the cam angle. Hence, arranging two cam angle sensors 41 and 42 at an interval of 45°×N (natural number) in the rotation direction of a detection target member 40 suffices. In the example shown in FIG. 4 as well, the phase difference $\phi$ of 90° in terms of the crank angle CA corresponds to an angle concerning the greatest common divisor of the explosion intervals (90°, 180°, and 270°). It is necessary to merely arrange the two cam angle sensors 41 and 42 at an interval of (the angle corresponding to the greatest common divisor)/2*N.

Figure 5:
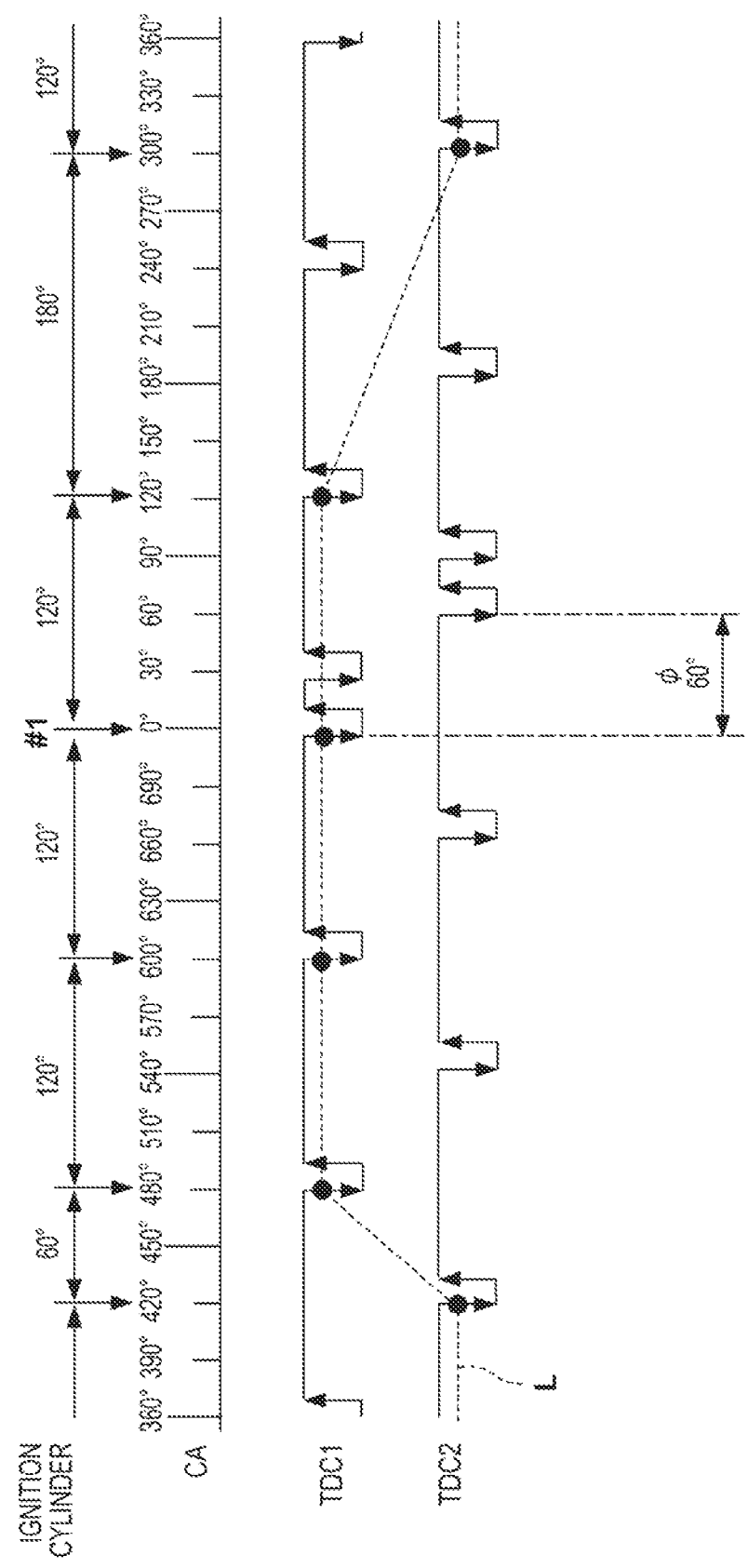
FIG. 5 is a view showing an example of application to still another multi-cylinder engine.

FIG. 5 shows changes of detection signal strings in an example of application to a V-type 6-cylinder engine. In the example shown in FIG. 5, the explosion intervals are 120°, 180°, 120°, 60°, 120°, and 120° in terms of the crank angle. Six detection target portions 401 are provided at equal pitches in accordance with the number of cylinders. In the example shown in FIG. 5, the detection signal TDC1 is used as the ignition timing signal for four cylinders, and the detection signal TDC2 is used as the ignition timing signal for the remaining two cylinders.

When the detection signal TDC1 and the detection signal TDC2 are regarded as the detection signal strings of the plurality of detection target portions 401, these have the phase difference φ of 60° in terms of the crank angle CA. This corresponds to 30° in terms of the cam angle. Hence, arranging the two cam angle sensors 41 and 42 at an interval of 30°×N (natural number) in the rotation direction of the detection target member 40 suffices. In the example shown in FIG. 5 as well, the phase difference φ of 60° in terms of the crank angle CA corresponds to an angle concerning the greatest common divisor of the explosion intervals (60°, 120°, and 180°). It is necessary to merely arrange the two cam angle sensors 41 and 42 at an interval of (the angle corresponding to the greatest common divisor)/2*N.

Third Embodiment

In the first and second embodiments, an arrangement for igniting each cylinder once in a combustion stroke is assumed, and the detection target portions 401 for ignition timing are provided as many as the number of cylinders. An arrangement for igniting each cylinder twice in a combustion stroke can also be employed. In this case, detection target portions 401 as many as the number of cylinders may be arranged as one set, and two sets may be provided while being shifted in the rotation direction of a detection target member 40.

SUMMARY OF EMBODIMENTS

The above-described embodiments disclose at least a detection apparatus and a control apparatus to be described below.

1. A detection apparatus according to the above-described embodiment is a detection apparatus (4) for detecting a cam angle of a 4-stroke multi-cylinder engine (100) in which explosion intervals are unequal intervals, comprising:

a detection target member (40) configured to rotate in synchronism with a camshaft (102);

a first cam angle sensor (41) configured to detect rotation of the detection target member (40); and a second cam angle sensor (42) configured to detect rotation of the detection target member (40);

wherein the detection target member (40) includes a plurality of first detection target portions (401) arranged, at equal pitches, as many as the number of cylinders of the multi-cylinder engine in a rotation direction of the detection target member, and the second cam angle sensor (42) is arranged while being shifted in the rotation direction with respect to the first cam angle sensor (41) such that any one of detection signals (TDC1, TDC2) of the plurality of first detection target portions (401) by the first cam angle sensor (41) and the second cam angle sensor (42) is output at a timing corresponding to each explosion interval.

According to this embodiment, it is possible to provide a technique of obtaining an ignition timing signal without setting the positions of detection target portions for ignition timing in correspondence with unequal explosion intervals.

2. In the above-described embodiment, the detection target member (40) includes a second detection target portion (402) that is adjacent to one of the plurality of first detection target portions (401) and corresponds to a position of a piston of a specific cylinder.

According to this embodiment, it is possible to perform stroke discrimination and more reliably discriminate the first detection target portions and the second detection target portion.

3. In the above-described embodiment, if an angle concerning a greatest common divisor of the explosion intervals is set as φ in terms of a crank angle, the second cam angle sensor (42) is arranged while being shifted in the rotation direction with respect to the first cam angle sensor (41) such that detection signals (TDC2) of the plurality of first detection target portions by the second cam angle sensor (42) have a phase difference of φ/2 in terms of the cam angle with respect to detection signals (TDC1) of the plurality of first detection target portions by the first cam angle sensor (41).

According to this embodiment, it is possible to obtain an ignition timing signal without setting the positions of detection target portions for ignition timing in correspondence with unequal explosion intervals.

4. In the above-described embodiment, the second cam angle sensor (42) is arranged while being shifted, with respect to the first cam angle sensor (41), by φ/2 in the rotation direction from a position shifted by 180° in terms of the cam angle.

According to this embodiment, it is possible to sufficiently ensure the arrangement space of the two cam angle sensors.

5. A control apparatus according to the above-described embodiment is a control apparatus (1) of a 4-stroke multi-cylinder engine (100) in which explosion intervals are unequal intervals, comprising:

the above-described detection apparatus (4); and a crank angle sensor (31), wherein the control apparatus comprises:

a control unit (2) configured to control an ignition timing based on two detection results of the first cam angle sensor (41) and the second cam angle sensor (42) provided in the detection apparatus and the crank angle sensor (31).

According to this embodiment, an ignition timing signal can be obtained by the combination of the plurality of sensors.

6. In the above-described embodiment, the control unit (2)

controls the ignition timing based on the detection results of the first cam angle sensor (41) and the second cam angle sensor (42) at a start of the multi-cylinder engine (100), and controls the ignition timing based on the detection results of one of the first cam angle sensor (41) and the second cam angle sensor (42) and the detection result of the crank angle sensor (31) after the start of the multi-cylinder engine (100).

According to this embodiment, starting stability can be improved.

7. In the above-described embodiment, if a failure occurs in one of the first cam angle sensor (41), the second cam angle sensor (42), and the crank angle sensor (31), the control unit (2) controls the ignition timing based on remaining two sensor's detection results.

According to this embodiment, even if a failure occurs in one sensor, the engine can be started.

8. In the above-described embodiment, the multi-cylinder engine is an outboard engine.

According to this embodiment, it is possible to cope with a sensor failure on the sea.

The invention is not limited to the foregoing embodiments, and various variations/changes are possible within the spirit of the invention.

What is claimed is:

1. A detection apparatus for detecting a cam angle of a 4-stroke multi-cylinder engine in which explosion intervals are unequal intervals, comprising:
   a detection target member configured to rotate in synchronism with a camshaft;
   a first cam angle sensor configured to detect rotation of the detection target member so as to output a detection signal as a reference ignition timing signal for an advance or retard ignition timing; and
   a second cam angle sensor configured to detect rotation of the detection target member so as to output a detection signal as the reference ignition timing signal;
   wherein the detection target member includes a plurality of first detection target portions for ignition timings arranged, at equal pitches, as many as the number of cylinders of the multi-cylinder engine in a rotation direction of the detection target member, and
   the second cam angle sensor is arranged while being shifted in the rotation direction with respect to the first cam angle sensor such that any one of detection signals of the plurality of first detection target portions by the first cam angle sensor and the second cam angle sensor is output as the reference ignition timing signal at a timing corresponding to each explosion interval of the explosion intervals.

2. The apparatus according to claim 1, wherein the detection target member includes a second detection target portion that is adjacent to one of the plurality of first detection target portions and corresponds to a position of a piston of a specific cylinder.

3. The apparatus according to claim 1, wherein if an angle concerning a greatest common divisor of the explosion intervals is set as $\phi$ in terms of a crank angle, the second cam angle sensor is arranged while being shifted in the rotation direction with respect to the first cam angle sensor such that detection signals of the plurality of first detection target portions by the second cam angle sensor have a phase difference of $\phi/2$ in terms of the cam angle with respect to detection signals of the plurality of first detection target portions by the first cam angle sensor.

4. The apparatus according to claim 3, wherein the second cam angle sensor is arranged while being shifted, with respect to the first cam angle sensor, by $\phi/2$ in the rotation direction from a position shifted by 180° in terms of the cam angle.

5. A control apparatus of a 4-stroke multi-cylinder engine in which explosion intervals are unequal intervals, comprising:
   the detection apparatus according to claim 1;
   a crank angle sensor; and
   a control unit configured to control an ignition timing based on two detection results of the first cam angle sensor and the second cam angle sensor provided in the detection apparatus and the crank angle sensor.

6. The apparatus according to claim 5, wherein the control unit
   controls the ignition timing based on the detection results of the first cam angle sensor and the second cam angle sensor at a start of the multi-cylinder engine, and
   controls the ignition timing based on the detection result of one of the first cam angle sensor and the second cam angle sensor and the detection result of the crank angle sensor after the start of the multi-cylinder engine.

7. The apparatus according to claim 5, wherein if a failure occurs in one of the first cam angle sensor, the second cam angle sensor, and the crank angle sensor, the control unit controls the ignition timing based on remaining two sensor's detection results.

8. The apparatus according to claim 5, wherein the multi-cylinder engine is an outboard engine.

9. The apparatus according to claim 1, wherein the engine includes six cylinders, and the detection target member includes six first detection target portions.

10. The apparatus according to claim 1, wherein the engine includes eight cylinders, and the detection target member includes eight first detection target portions.

* * * * *